United States Patent
Miller et al.

(10) Patent No.: US 6,508,241 B2
(45) Date of Patent: Jan. 21, 2003

(54) EQUIVALENCE RATIO-BASED SYSTEM FOR CONTROLLING TRANSIENT FUELING IN AN INTERNAL COMBUSTION ENGINE

(75) Inventors: Paul R. Miller, Columbus, IN (US); Chuan He, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/773,068

(22) Filed: Jan. 31, 2001

(65) Prior Publication Data

US 2002/0100466 A1 Aug. 1, 2002

(51) Int. Cl.$^7$ .............................................. F02D 41/00
(52) U.S. Cl. ........................ 123/672; 123/480; 123/436
(58) Field of Search ................................. 123/672, 480, 123/436, 676, 687; 701/104, 108, 109

(56) References Cited

U.S. PATENT DOCUMENTS

| | | | |
|---|---|---|---|
| 4,852,538 A | * | 8/1989 | Nagaishi ..................... 123/492 |
| 5,076,237 A | | 12/1991 | Hartman et al. |
| 5,150,694 A | | 9/1992 | Currie et al. |
| 5,284,116 A | | 2/1994 | Richeson, Jr. |
| 5,375,583 A | | 12/1994 | Meyer et al. |
| 5,377,651 A | | 1/1995 | Sczomak et al. |
| 5,625,750 A | | 4/1997 | Puskorius et al. |
| 5,682,317 A | | 10/1997 | Keeler et al. |
| 5,771,868 A | | 6/1998 | Khair |
| 6,012,431 A | | 1/2000 | Itoyama et al. |

FOREIGN PATENT DOCUMENTS

| | | |
|---|---|---|
| EP | 1 001 153 A1 | 5/2000 |
| EP | 1 024 275 A2 | 8/2000 |

* cited by examiner

*Primary Examiner*—Gene Mancene
*Assistant Examiner*—Johnny H. Hoang
(74) *Attorney, Agent, or Firm*—Barnes & Thornburg (57) ABSTRACT

An equivalence ratio-based system for controlling transient engine fueling includes an engine controller responsive to a number of engine operating conditions to estimate a mass of oxygen trapped within a number of cylinders of an internal combustion engine. The engine controller is further operable to map current values of engine speed and commanded fueling to one of a number of predetermined maximum fuel-to-oxygen, or equivalence, ratio values ($\Phi_{MAX}$). The engine controller is then operable to determine an oxygen/fuel control (OFC) limited fueling command ($F_{OFCL}$) as a function of the estimated oxygen mass value and the maximum equivalence ratio, and to limit engine fueling based on the OFC limited fueling command $F_{OFCL}$. In one embodiment, the engine controller is operable to fuel the engine according to a minimum of the OFC limited fueling command $F_{OFCL}$ and a default fueling command $F_{DEF}$, although other fuel limiting strategies are contemplated.

24 Claims, 6 Drawing Sheets

EQUIVALENCE RATIO-BASED SYSTEM FOR CONTROLLING TRANSIENT FUELING IN AN INTERNAL COMBUSTION ENGINE

FIELD OF THE INVENTION

The present invention relates generally to fuel management systems for internal combustion engines, and more specifically to such systems for controlling transient particulate emissions by controlling a transient fuel-to-oxygen, or equivalence, ratio.

BACKGROUND OF THE INVENTION

When combustion occurs in an environment with excess oxygen, peak combustion temperatures increase which leads to the formation of unwanted emissions, such as oxides of nitrogen ($NO_x$). Particulate emissions are likewise generally undesirable, and the amount of transient particulate emissions produced by an engine is largely a function of the transient peak overall fuel-to-oxygen, or equivalence, ratio ($\Phi$). Unfortunately, both problems are aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted $NO_x$ emissions involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold.

Constraining particulate emissions, on the other hand, requires carefully controlling the equivalence ratio ($\Phi$), particularly during transient operating conditions. However, no systems are currently known for accurately estimating in-cylinder oxygen content in dynamic fuel/$O_2$ environments that are generally characteristic of EGR-based systems. Accordingly, no accurate equivalence ratio-based fuel control systems are known to exist. What is therefore needed is a system for accurately determining in-cylinder oxygen content, and for controlling the fuel-to-oxygen, or equivalence, ratio $\Phi$ based on this information as well as on other current operating conditions to thereby minimize transient particulate emissions while optimizing transient torque capability in a dynamic fuel/$O_2$ environment that is characteristic of EGR-based systems.

SUMMARY OF THE INVENTION

The foregoing shortcomings of the prior art are addressed by the present invention. In accordance with one aspect of the present invention, an equivalence ratiobased system for controlling transient fueling in an internal combustion engine comprises an engine speed sensor producing an engine speed signal indicative of rotational speed of an internal combustion engine, means for determining a quantity of oxygen trapped within a number of cylinders of the engine and producing an oxygen estimate corresponding thereto, and a control circuit producing a fueling command for fueling the engine and determining a maximum equivalence ratio value based on the fueling command and the engine speed signal, the control circuit limiting the fueling command based on the maximum equivalence ratio and the oxygen estimate.

In accordance with another aspect of the present invention, an equivalence ratio-based system for controlling transient fueling in an internal combustion engine comprises an engine speed sensor producing an engine speed signal indicative of rotational speed of an internal combustion engine, means for determining a residual mass value corresponding to a mass of residual gases trapped within a number of cylinders of the engine, means for producing a fueling command for fueling the engine, means responsive to the residual mass value, the engine speed signal and the fueling command for determining a quantity of oxygen trapped within the number of cylinders of the engine and producing an oxygen value corresponding thereto, and a control circuit limiting the fueling command based on the engine speed signal, the fueling command and the oxygen value.

In accordance with yet another aspect of the present invention, an equivalence ratio-based method for controlling transient fueling in an internal combustion engine comprises the steps of sensing rotational speed of an internal combustion engine and producing an engine speed signal corresponding thereto, determining a maximum equivalence ratio value based on an engine fueling command and the engine speed signal, determining a quantity of oxygen trapped within a number of cylinders of the engine and producing an oxygen value corresponding thereto, and limiting fuel supplied to the engine command based on the maximum equivalence ratio and the oxygen value.

In accordance with still another aspect of the present invention, an equivalence ratio-based method for controlling transient fueling in an internal combustion engine comprises the steps of sensing rotational speed of an internal combustion engine and producing an engine speed signal corresponding thereto, determining a residual mass value corresponding to a mass of residual gases trapped within a number of cylinders of the engine, producing a fueling command for fueling the engine, determining a quantity of oxygen trapped within the number of cylinders of the engine based on the engine speed, the residual mass value and the fueling command and producing an oxygen value corresponding thereto, and limiting the fueling command based on the engine speed signal, the fueling command and the oxygen value.

One object of the present invention is to provide a fueling control system for minimizing particulate emissions while optimizing engine output torque capabilities under transient operating conditions.

Another object of the present invention is to provide such a system for achieving the foregoing object in a dynamic fuel-oxygen environment characteristic of EGR-based systems.

Still another object of the present invention is to provide a fuel control system operable to achieve the foregoing objects by controlling a maximum fuel-to-oxygen, or equivalence, ratio ($\Phi$) based on a computed amount of oxygen trapped within a number of cylinders of the engine as well as on other engine operating conditions.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
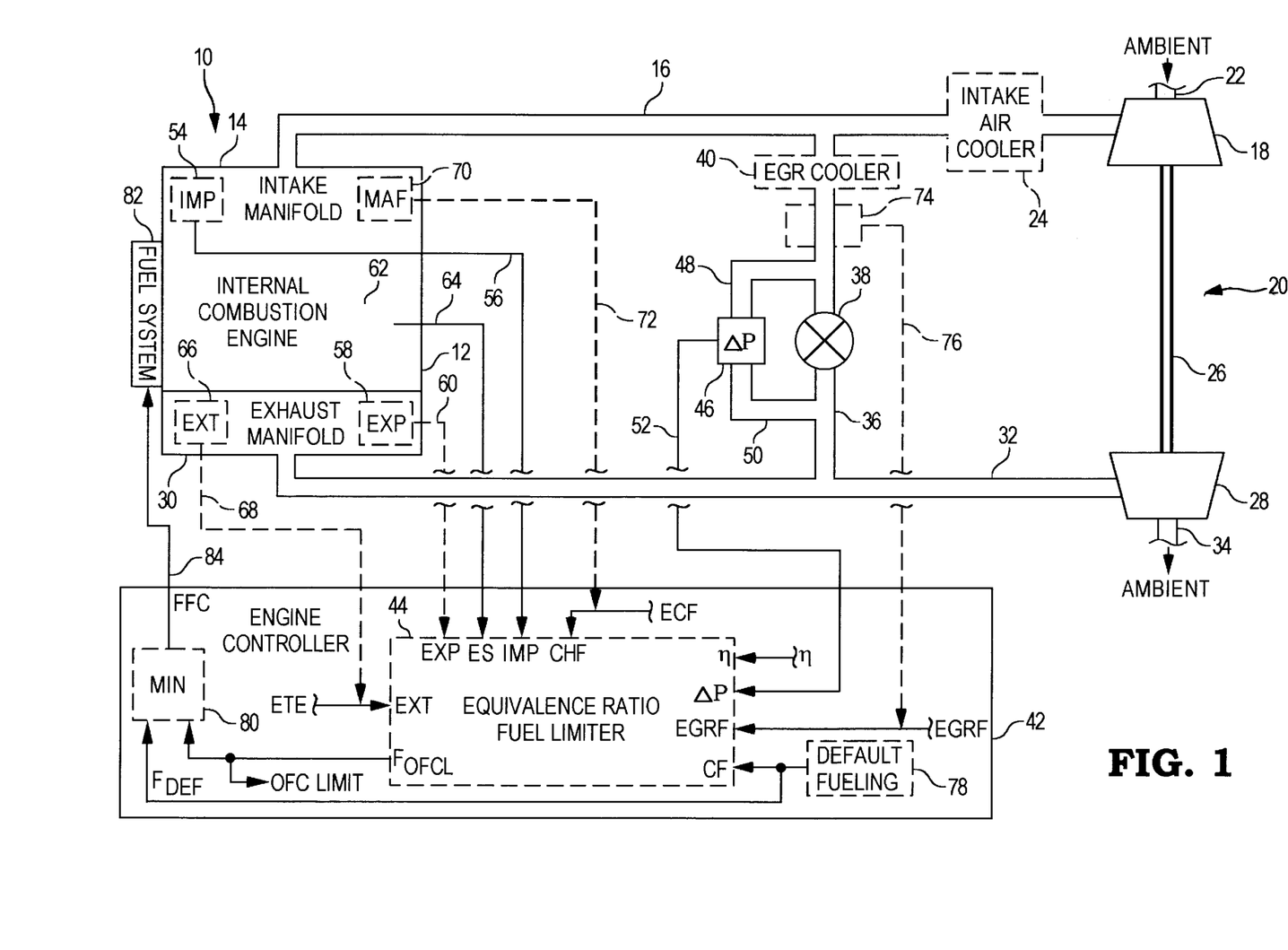
FIG. 1 is a diagrammatic illustration of one preferred embodiment of an equivalence ratio-based system for controlling transient fueling in an internal combustion engine, in accordance with the present invention.

Referring now to FIG. 1, one preferred embodiment of a system 10 for controlling engine exhaust temperature, in accordance with the present invention, is shown. System 10 includes an internal combustion engine 12 having an intake manifold 14 fluidly coupled to a compressor 18 of a turbocharger 20 via intake conduit 16, wherein the compressor 18 receives fresh air via fresh air conduit 22. Optionally, as shown in phantom in FIG. 1, system 10 may include an intake air cooler 24 of known construction disposed in line with intake conduit 16 between the turbocharger compressor 18 and the intake manifold 14. The turbocharger compressor 18 is mechanically coupled to a turbocharger turbine 28 via drive shaft 26, wherein turbine 28 is fluidly coupled to an exhaust manifold 30 of engine 12 via exhaust conduit 32, and is further fluidly coupled to ambient via exhaust conduit 34. The exhaust conduit 32 is fluidly coupled to intake conduit 16 via an EGR conduit 36 having a flow restriction structure disposed in-line with conduit 36. In the embodiment illustrated in FIG. 1, the flow restriction structure is an EGR valve 38, although the present invention contemplates providing for alternative or additional flow restriction structures along EGR conduit 38. In any case, an EGR cooler 40 of known construction may optionally be disposed between EGR valve 38 and intake conduit 16 as shown in phantom in FIG. 1.

System 10 includes an engine controller 42 that is preferably microprocessorbased and is generally operable to control and manage the overall operation of engine 12. Engine controller 42 includes a number of inputs and outputs for interfacing with various sensors and systems coupled to engine 12, and in one embodiment, controller 42 may be a known control unit sometimes referred to as an electronic or engine control module (ECM), electronic or engine control unit (ECU) or the like, or may alternatively be a general control circuit capable of operation as described hereinafter.

In any case, control circuit 20 includes a default fueling block 34 receiving the engine speed signal (ESP) from engine speed sensor 26 via signal path 28, as well as a number of additional input signals 36. Block 34 is responsive to the ESP signal on signal path 28 as well as one or more of the additional signals 36 to compute a default fueling command (DFC) in accordance with techniques well-known in the art. The default fueling command DFC may be an unrestricted fueling command that is used as the final fueling command FFC produced on any number, M, of signal paths 42 for controlling fuel system 40, wherein M may be any positive integer. As it relates to the present invention, however, the default fueling determination block 34 may alternatively or additionally include one or more fuel limiting algorithms designed to achieve certain engine operational goals, wherein the default fueling command DFC produced by block 34 represents an unrestricted fueling command that has been limited by one or more such fuel limiting algorithms.

In accordance with the present invention, engine controller 42 includes an equivalence ratio fuel limiter block 44 receiving a number of input signals and values and producing an oxygen/fuel control (OFC) limited fueling command FOFCL that is also shown in FIG. 1 as being provided to other control blocks within engine controller 42 as an oxygen/fuel control limit value OFC LIMIT. As used herein, the term "equivalence ratio" (represented by the symbol $\Phi$) is defined as the fuel-to-oxygen ratio of charge entering the intake manifold 14 of engine 12. In accordance with the present invention, block 44 is operable to control $\Phi$ by controlling the OFC limited fueling command $F_{OFCL}$ based on information relating to current values of total oxygen trapped within the cylinders of engine 12 and other engine operating conditions. In general, the values of the OFC limited fueling command $F_{OFCL}$ are chosen such that the resulting equivalence ratio $\Phi$ yields transient particulate emissions below to a desired level while also optimizing transient engine output torque. Engine controller 42 also includes a default fueling block 78 producing a default fueling command $F_{DEF}$, wherein the OFC limited fueling command $F_{OFCL}$ and the default fueling command $F_{DEF}$ are provided as inputs to a MIN block 80. MIN block 80 is operable to produce a final fueling command FFC on signal path 84 that is a minimum of the OFC limited fueling command $F_{OFCL}$ and the default fueling command $F_{DEF}$. Fuel system 82 is responsive to the final fueling command FFC to supply fuel to engine 12 as is known in the art. In a general sense, the default fueling command $F_{DEF}$ is preferably determined in a known manner and represents a conventional fueling command determined and asserted by engine controller 42 based on a number of engine operating conditions as is known in the art.

System 10 includes a number of sensors and sensing systems for providing the engine controller 42 with information relating to the operation of engine 12. For example, the system 10 includes a differential pressure sensor 46 having one input fluidly connected to EGR conduit 36 adjacent to one end of EGR valve 38 via conduit 48, and an opposite input fluidly connected to EGR conduit 36 adjacent to an opposite end of EGR valve 38 via conduit 50. Differential pressure (ΔP) sensor 46 is preferably of known construction and is electrically connected to a ΔP input of the equivalence ratio fuel limiter block 44 via signal path 52. In operation, the ΔP sensor 46 is operable to produce a differential pressure signal on signal path 52 indicative of a differential pressure across EGR valve 38. An intake manifold pressure (IMP) sensor 54 of known construction is disposed in fluid communications with the intake manifold 14 and is electrically connected to an intake manifold pressure (IMP) input of the equivalence ratio fuel limiter block 44 via signal path 56. The IMP sensor 54 is operable to produce a pressure signal on signal path 56 indicative of intake manifold pressure. As will be described in greater detail hereinafter, the equivalence ratio fuel limiter block 44 is operable to determine the OFC limited fueling command $F_{OFCL}$ as a function of, among other engine operating conditions, the pressure of exhaust gas produced by engine 12, and in one embodiment block 44 is operable to determine exhaust pressure as a sum of the differential pressure signal produced by the ΔP sensor 46 and the intake manifold pressure signal produced by the IMP sensor 54. Alternatively, system 10 may include a known exhaust pressure sensor (EXP) 56 in fluid communications with the exhaust manifold 30 or exhaust conduit 32 and electrically connected to an exhaust pressure input (EXP) of block 44 via signal path 60 as shown in phantom in FIG. 1. In this embodiment, the EXP sensor 58 is operable to provide the equivalence ratio fuel limiter block 44 with a signal indicative of exhaust pressure, and the IMP sensor 54 and ΔP sensor 46 may thus be omitted from system 10. In an alternative embodiment, engine controller 42 may includes a known exhaust pressure estimation strategy operable to produce an estimated exhaust pressure value, wherein the estimated exhaust pressure value is provided to the exhaust pressure input EXP of block 44.

System 10 also includes an engine speed sensor 62 operable to sense rotational speed of the engine 12 and produce an engine speed signal on signal path 64 indicative of engine rotational speed. In one embodiment, sensor 62 is a Hall effect sensor operable to determine engine speed by sensing passage thereby of a number of equi-angularly spaced teeth formed on a gear or tone wheel. Alternatively, engine speed sensor 62 may be any other known sensor operable as just described including, but not limited to, a variable reluctance sensor or the like. In any case, the engine speed signal provided on signal path 64 is supplied as an engine speed (ES) input to the equivalence ratio fuel limiter block 44 of engine controller 42.

The equivalence ratio fuel limiter block 44 of engine controller 42 also includes an exhaust temperature input (EXT) configured to receive a signal or value indicative of the current temperature of exhaust gas produced by engine 12. In one embodiment, engine controller 42 preferably includes an exhaust temperature estimation strategy operable to produce an estimated exhaust temperature value (ETE), wherein the ETE value is provided to the exhaust temperature input EXT of block 44. A preferred exhaust temperature estimation strategy for use with the present invention is described in U.S. patent application Ser. No. 09/774,987, entitled SYSTEM FOR CONTROLLING ENGINE EXHAUST TEMPERATURE, which is assigned to the assignee of the present invention and the disclosure of which is incorporated herein by reference, although the present invention contemplates using other known exhaust temperature determination strategies. In an alternate embodiment of the present invention, system 10 may include a known exhaust temperature sensor (EXT) 66 in fluid communications with the exhaust manifold 30 or exhaust conduit 32 and electrically connected to the exhaust temperature input (EXT) of block 44 via signal path 68 as shown in phantom in FIG. 1. In this embodiment, the EXT sensor 66 is operable to provide the equivalence ratio fuel limiter block 44 with a signal indicative of exhaust temperature, and the exhaust temperature estimation strategy within engine controller 42 may thus be omitted.

The equivalence ratio fuel limiter block 44 of engine controller 42 also includes an exhaust gas recirculation flow (EGRF) input configured to receive a signal or value indicative of EGR mass flow supplied by the exhaust conduit 32 to the intake conduit 16 via EGR conduit 36. In one embodiment, engine controller 42 preferably includes an EGR mass flow estimation strategy operable to produce an estimated EGR mass flow value (EGRF), wherein the EGRF value is provided to the EGR flow input EGRF of block 44. A preferred EGR mass flow estimation strategy for use with the present invention is described in U.S. patent application Ser. No. 09/774,897, entitled SYSTEM AND METHOD FOR ESTIMATING EGR MASS FLOW AND EGR FRACTION, which is assigned to the assignee of the present invention and the disclosure of which is incorporated herein by reference, although the present invention contemplates using other known EGR mass flow determination strategies. In an alternative embodiment of the present invention, system 10 may include a known mass flow sensor 74 in fluid communications with the EGR conduit 36 preferably between the EGR valve 38 and the intake conduit 16, and electrically connected to the EGR flow input (EGRF) of block 44 via signal path 76 as shown in phantom in FIG. 1. In this embodiment, the mass flow sensor 74 is operable to provide the equivalence ratio fuel limiter block 44 with a signal indicative of EGR mass flow, and the EGR mass flow estimation strategy within the engine controller 42 may thus be omitted.

The equivalence ratio fuel limiter block 44 of engine controller 42 also includes a charge flow (CHF) input configured to receive a signal or value indicative of the mass flow of charge supplied to the intake manifold 14 of engine 12 and a volumetric efficiency (η) input configured to receive a value indicative of the volumetric efficiency of the intake manifold 14. In one embodiment, engine controller 42 preferably includes a charge flow estimation strategy operable to produce an estimated mass charge flow value (CHF) and an estimated volumetric efficiency value (η), and one embodiment of a system for estimating mass charge flow and volumetric efficiency is illustrated in FIG. 2.

Figure 2:
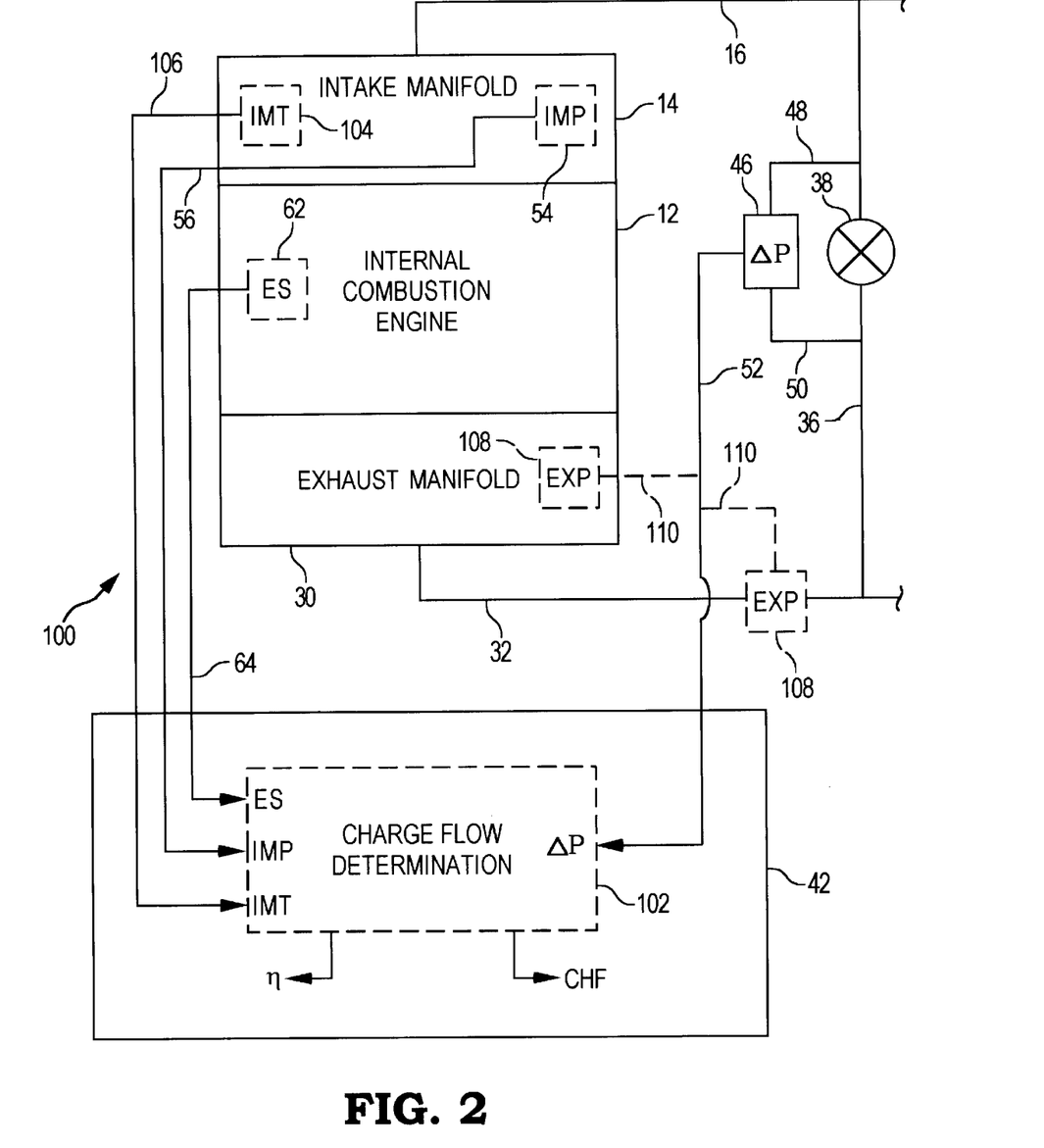
FIG. 2 is a diagrammatic illustration of one preferred embodiment of a technique for determining a charge flow parameter for use by the equivalence ratio fuel limiter block of FIG. 1.

Referring now to FIG. 2, one preferred embodiment of a system 100 for estimating mass charge flow and volumetric efficiency is shown. The term "charge", as used herein, is defined as a composition of fresh air supplied by conduit 16 via turbocharger compressor 18 and exhaust gas supplied by exhaust conduit 32 via EGR valve 38, and mass charge flow is thus the mass flow of charge supplied to the intake manifold 14 of engine 12. System 100 includes several components in common with system 10 of FIG. 1, and like numbers are therefore used to identify like components. For example, system 100 includes an internal combustion engine 12 having an intake manifold 14 fluidly coupled to a compressor 18 of a turbocharger 20 (not shown) via intake conduit 16, wherein conduit 16 receives fresh air via the turbocharger compressor as described with respect to FIG. 1.

An exhaust manifold 30 of engine 12 expels exhaust gas to ambient via exhaust conduit 32, and an EGR valve 38 is preferably disposed in fluid communication with the intake and exhaust conduits 16 and 32 respectively via EGR conduit 36. A ΔP sensor 46 is preferably positioned across the EGR valve 38 via conduits 48 and 50, and is electrically connected to an input of a charge flow determination block 102 of engine controller 42 via signal path 52. An intake manifold pressure sensor 54 is connected to another input of the charge flow determination block 102 via signal path 56, and an engine speed sensor 62 is electrically connected to another input of block 102 via signal path 64.

An intake manifold temperature sensor (IMT) 104 is disposed in fluid communication with the intake manifold 14 of engine 12, and is electrically connected to another input of the charge flow determination block 102 of engine controller 44 via signal path 106. IMT sensor 104 is preferably a known sensor operable to produce a signal on signal path 106 corresponding to the temperature of charge flowing into the intake manifold 14. Optionally, as shown and described with respect to FIG. 1, system 100 may include an exhaust pressure sensor EXP 68 disposed in fluid communication with the exhaust manifold 30 or exhaust conduit 32, as shown in phantom in FIG. 2, wherein either sensor 68 may be connected to the ΔP input of block 102.

In one preferred embodiment, the charge flow determination block 102 of the engine controller 42 is operable to compute an estimate of the mass flow of charge (ECF) into intake manifold 14 by first estimating the volumetric efficiency (η) of the charge intake system, and then computing ECF as a function of η using a conventional speed/density equation. Any known technique for estimating η may be used, and in one preferred embodiment of block 102, is computed according to a known Taylor mach number-based volumetric efficiency equation given as:

$$\eta = A_1 * \{(Bore/D)^2 * (stroke*ES)^B / sqrt(\gamma*R*IMT) * [(1+EXP/IMP)+A_2]\} + A_3 \quad (1),$$

where,
$A_1, A_2, A_3$ and B are all calibratable parameters preferably fit to the volumetric efficiency equation based on mapped engine data,
Bore is the intake valve bore length,
D is the intake valve diameter,
stroke is the piston stroke length, wherein Bore, D and stroke are generally dependent upon engine geometry,
$\gamma$ and R are known constants ($\gamma*R$=387.414 KJ/kg/deg K),
ES is engine speed,
IMP is the intake manifold pressure,
EXP is the exhaust pressure, where EXP=IMP+ΔP, and
IMT =intake manifold temperature.

From the foregoing equation, it should be apparent that system 100 may substitute an exhaust pressure sensor 68, as shown in phantom in FIG. 2, for the ΔP sensor 46, although commercially available exhaust pressure sensors that are capable of withstanding harsh environments associated with the exhaust manifold 30 and/or exhaust conduit 32 are not typically available. For purposes of the present invention, a ΔP sensor 46 is therefore preferably used.

With the volumetric efficiency value T estimated according to equation (1), the estimate charge flow value ECF is preferably computed according to the equation:

$$ECF = \eta * V_{DIS} * ES * IMP / (2*R*IMT) \quad (2),$$

where,
η is the estimated volumetric efficiency,
$V_{DIS}$ is engine displacement and is generally dependent upon engine geometry,
ES is engine speed,
IMP is the intake manifold pressure,
R is a known gas constant (R=54), and
IMT is the intake manifold temperature.

Referring again to FIG. 1, those skilled in the art will recognize that a mass air flow sensor 70 of known construction may alternatively be disposed within the intake manifold 14, wherein information provided by such a mass air flow sensor on signal path 72 may be used to determine mass charge flow directly rather than using a charge flow virtual sensor as just described.

Figure 3:
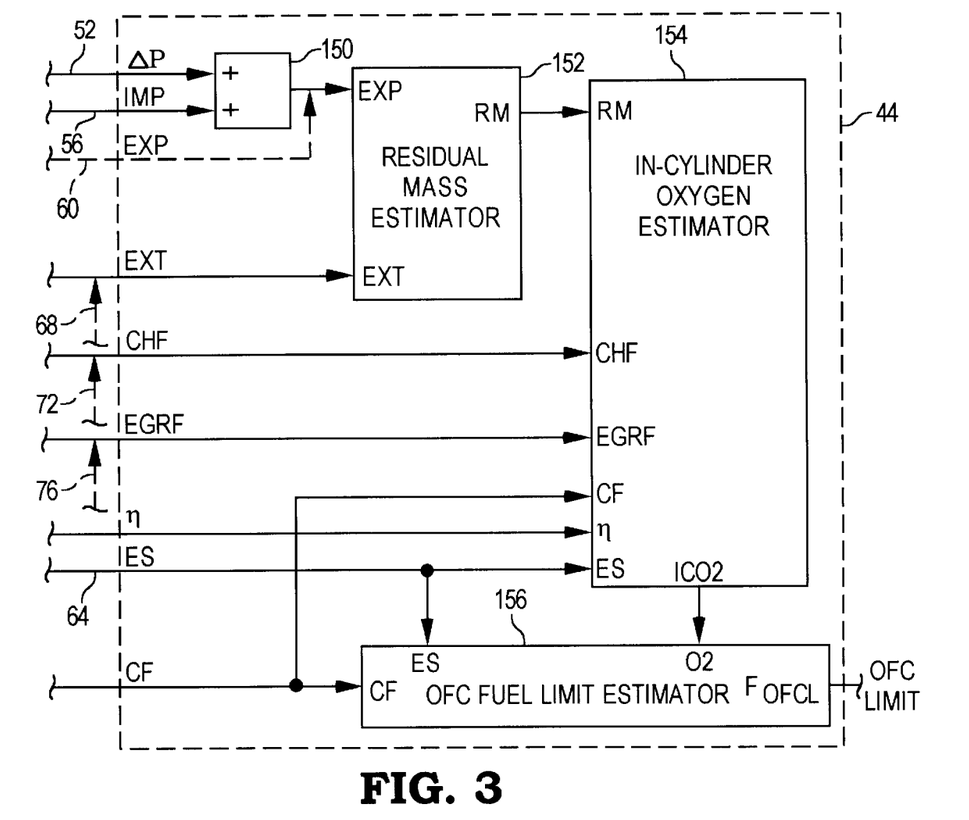
FIG. 3 is a diagrammatic illustration of one preferred embodiment of the equivalence ratio fuel limiter block of FIG. 1, in accordance with the present invention.

Referring now to FIG. 3, one preferred embodiment of the equivalence ratio fuel limiter block 44 of FIG. 1, in accordance with the present invention, is shown. In one embodiment, block 44 preferably includes a summation block 150 having a first input receiving the differential pressure signal (ΔP) from signal path 52, a second input receiving the intake manifold pressure signal (IMP) from signal path 56, and an output producing an exhaust pressure value as a sum of the ΔP and IMP signals, wherein the exhaust pressure output value of block 150 is provided to an exhaust pressure (EXP) input of a residual mass estimator block 152. Alternatively, as described hereinabove with respect to FIG. 1, system 10 may include an exhaust pressure sensor 58 and the exhaust pressure (EXP) input of the residual mass estimator block 152 may thus be configured to receive an exhaust pressure signal directly from sensor 58 via signal path 60. In this embodiment, sensors 46 and 54 may be omitted from system 10 for purposes of the present invention. In any case, an exhaust temperature (EXT) input of the residual mass estimator block 152 is configured, in one preferred embodiment, to receive an estimated exhaust temperature value (ETE) supplied by an engine exhaust temperature estimation strategy included within the engine controller 42 as described hereinabove with respect to FIG. 1. Alternatively, system 10 may include an engine exhaust temperature sensor 66 as described above, and the exhaust temperature (EXT) input of the residual mass estimator block 152 may thus be configured to receive an exhaust temperature signal directly from sensor 66 via signal path 68. Regardless of the sources of the exhaust pressure and exhaust temperature signals or values, the residual mass estimator block 152 is operable to compute a residual mass value (RM) as a function of the exhaust pressure and exhaust temperature values and to supply the residual mass value (RM) to a residual mass input (RM) of an in-cylinder oxygen estimator block 154. In accordance with the present invention, the residual mass value (RM) corresponds to a mass of residual gases trapped within the cylinders of engine 12, and one preferred strategy for computing RM will be fully described hereinafter with respect to FIG. 4.

The in-cylinder oxygen estimator block 154 includes charge flow (CHF) and volumetric efficiency ηinputs preferably configured to receive an estimated charge flow value (ECF) and an estimated volumetric efficiency value (η) respectively supplied by a charge flow estimation strategy included within the engine controller 42 as described hereinabove with respect to FIG. 2. Alternatively, system 10 may include a mass flow sensor 70 as described above, and the charge flow (CHF) input of the in-cylinder oxygen estimation block 154 may thus be configured to receive a mass charge flow signal directly from sensor 70 via signal path 72. The in-cylinder oxygen estimator block 154 further includes an EGR mass flow (EGRF) input preferably configured to receive an estimated EGR mass flow value (EGRF) supplied by an EGR mass flow estimation strategy included within the engine controller 42 as described hereinabove with respect to FIG. 1. Alternatively, system 10 may include a mass flow sensor 74 as described above, and the EGR mass flow (EFRF) input of the in-cylinder oxygen estimation block 154 may thus be configured to receive an EGR mass flow signal directly from sensor 74 via signal path 76. The in-cylinder oxygen estimator block 154 further includes an engine speed (ES) input configured to receive the engine speed signal on signal path 64 and a commanded fueling (CF) input configured to receive the default fueling command $F_{DEF}$ from the default fueling block 78 of FIG. 1. The in-cylinder oxygen estimator block 154 is operable to compute an in-cylinder oxygen value (ICO2) as a function of the residual mass (RM), charge flow (CHF), EGR mass flow (EGRF), default fueling ($F_{DEF}$), volumetric efficiency ($\eta$), and engine speed (ES) values, and to supply the in-cylinder oxygen value (ICO2) to an oxygen input (O2) of an oxygen/fuel control (OFC) fuel limit estimator block 156. In accordance with the present invention, the in-cylinder oxygen value (ICO2) corresponds to a mass of oxygen trapped within the cylinders of engine 12, and one preferred strategy for computing ICO2 will be fully described hereinafter with respect to FIG. 5.

The OFC fuel limit estimator block 156 further includes commanded fuel (CF) input configured to receive the default fueling value ($F_{DEF}$) from block 78 (FIG. 1) and an engine speed input (ES) configured to receive the engine speed signal on signal path 64. The OFC fuel limit estimator block 156 is operable to compute the OFC limited fueling command $F_{OFCL}$ as a function of the in-cylinder oxygen value (ICO2), the commanded fueling value (CF) and the engine speed signal (ES), as will be described in detail hereinafter with respect to FIGS. 6 and 7.

Figure 4:
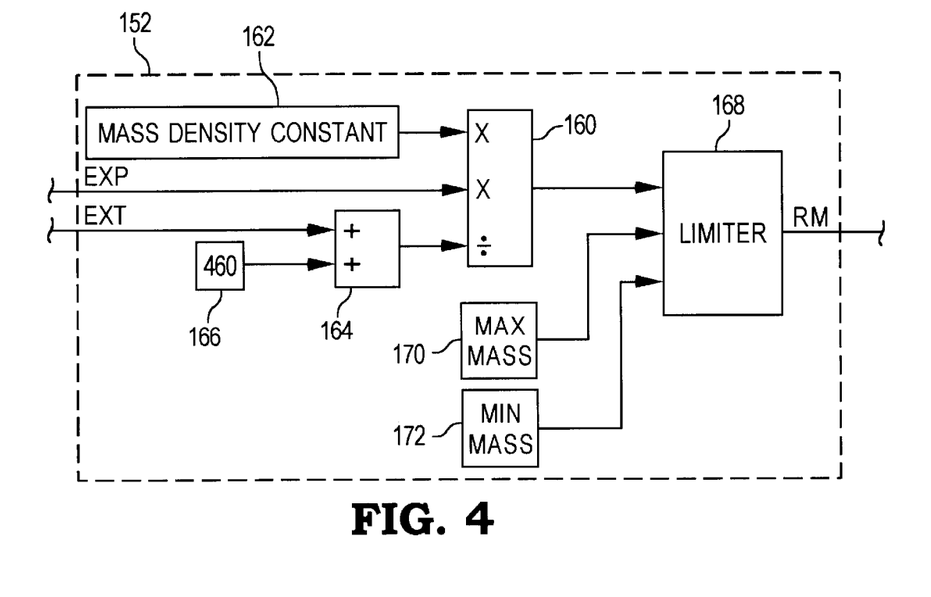
FIG. 4 is a diagrammatic illustration of one preferred embodiment of the residual mass estimator block of FIG. 3, in accordance with the present invention.

Referring now to FIG. 4, one preferred embodiment of the residual mass estimator block 152 of FIG. 3, in accordance with the present invention, is shown. Block 152 includes an arithmetic block 160 having a multiplication input receiving a mass density constant stored in block 162. In one embodiment, the mass density constant (MDC) is a function of engine geometry and is given by the equation:

$$MDC=(DIS*K1)/[(CR-1)*R*K2*NCYL] \quad (3),$$

where,
DIS is cylinder displacement (in$^3$),
K1 is a constant (453,600 mg/lbm),
CR is the cylinder compression ratio,
R is a gas constant (54 ft-lbf/lbm-°R),
K2 is a conversion constant (12 in/ft), and
NCYL is the number of cylinders in the engine.
A second multiplication input of arithmetic block 160 receives the exhaust pressure value EXP provided by summation block 150 or exhaust pressure sensor 58. A division input of block 160 receives an exhaust temperature value from summation block 164, wherein block 164 is operable to sum the exhaust temperature value ETE provided by an exhaust temperature estimation algorithm or exhaust temperature sensor 66 and a temperature conversion value stored within block 166. In a preferred embodiment of the present invention, exhaust temperature is used in units of degrees-R, and block 166 accordingly holds a conversion value (e.g., 460) for converting degrees-C to degrees-R. The output of arithmetic block 160 is provided as an input to a known limiter 168 having a second input receiving a maximum mass value from block 170 and a third input receiving a minimum mass value from block 172. An output of limiter 168 provides the residual mass value RM. In accordance with the control strategy illustrated in FIG. 4, the residual mass value; i.e., the mass of residual gases trapped in the number of cylinders of engine 12, is estimated according to the equation:

$$RM=(MDC*EXP)/EXT(^{\circ}R) \quad (4),$$

where,
MDC is the mass density constant,
EXP is the exhaust gas pressure, and
EXT is the exhaust gas temperature.

Figure 5:
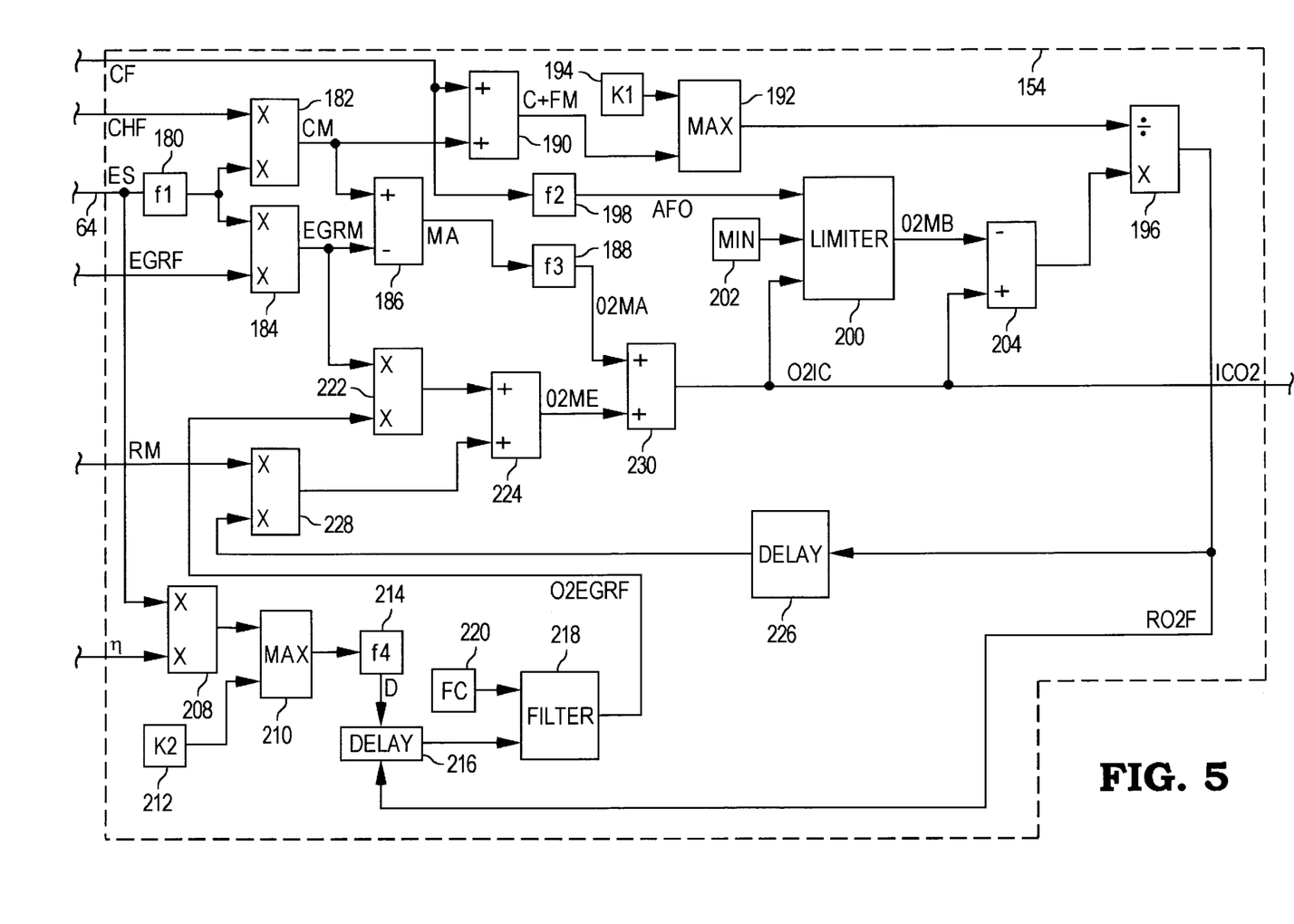
FIG. 5 is a diagrammatic illustration of one preferred embodiment of the in-cylinder oxygen estimator block of FIG. 3, in accordance with the present invention.

Referring now to FIG. 5, one preferred embodiment of the in-cylinder oxygen estimator block 154 of FIG. 3, in accordance with the present invention, is shown. Block 154 includes a first function block 180 receiving the engine speed signal from engine speed sensor 62 and computing an engine speed factor ESF according to a function f1. In one embodiment, the function f1 preferably produces an engine speed factor ESF according to the equation:

$$ESF=K1/[(NCYL/REVS\_CYCLE)*ES] \quad (5),$$

where,
K1 is a constant (e.g., 453257.77 mg/lbm),
NCYL is the number of cylinders in the engine 12,
REVS_CYCLE is the number of crankshaft revolutions per cycle (e.g., 2), and
ES is the engine speed (RPM).
The output of function block 180 is provided to a first multiplication input of an arithmetic block 182 having a second multiplication input receiving the charge flow value CHF from either the charge flow estimation strategy illustrated in FIG. 2 or from mass flow sensor 70. The output of arithmetic block 182 produces a charge mass value CM as the product of charge flow CHF and the engine speed function ESF. The output of function block 180 is also provided to a first multiplication input of another arithmetic block 184 having a second multiplication input receiving the EGR mass flow value EGRF from either an EGR mass flow estimation algorithm or from mass flow sensor 74. The output of arithmetic block 184 produces an EGR mass value EGRM as the product of EGR mass flow EGRF and the engine speed function ESF.

The charge mass value CM produced by block 182 is provided to an addition input of arithmetic block 186 and the EGR mass value EGRM produced by block 184 is provided to a subtraction input of block 186, wherein the output value MA produced by block 186 is the mass of air in the charge supplied to intake manifold 14. The mass air value MA is provided as an input to a function block 188 having a function f3 producing a value corresponding to the mass of oxygen in the air mass (O2MA) according to the equation:

$$O2MA=O2DA*MA \quad (6),$$

where,
O2DA is a conversion factor corresponding to a typical fraction of oxygen in dry air (e.g., 0.2319), and
MA is the mass of air value provided by block 186.

The commanded fueling value CF is provided to a first input of a summation block 190 having a second input receiving the charge mass value CM, wherein the output of block 190 corresponds to the mass of charge plus fuel (C+FM). A MAX block 192 has a first input receiving the C+FM value from block 190 and a second input receiving a constant K1 from block 194, wherein the output of block 192 corresponds to a maximum of C+FM and a minimum C+FM value K1. The output of MAX block 192 is provided to a division input of an arithmetic block 196.

The commanded fueling value CF is also provided to an input of a second function block 198 producing an air/fuel ratio oxygen value (AFO) according to the equation:

$$AFO = CF * STOICAFR * O2DA \qquad (7),$$

where,

CF is commanded fueling,

STOICAFR is a constant corresponding to a stoichiometric air/fuel ratio, and is a calibratable constant depending upon fuel type, and O2DA is a conversion factor corresponding to a typical fraction of oxygen in dry air (e.g., 0.2319).

The AFO value is provided as a first input to a known limiter block 200 having a second input receiving a minimum value MIN from block 202 and a third input receiving a maximum value O2IC (corresponding to the in-cylinder oxygen value output of block 154) from the output of summation block 230. The output O2MB of the limiter block 200 corresponds to the mass of oxygen required to burn the fuel trapped in the engine cylinders for the current combustion event, and is provided to a subtraction input of an arithmetic block 204 having a summation input receiving the O2IC value from the output of block 230. The output of block 204 is provided to a multiplication input of arithmetic block 196 having an output RO2F corresponding to the fraction of oxygen in the residual gases trapped in the cylinders of the engine 12.

A multiplication block 208 has a first input receiving the engine speed signal ES and a second input receiving the volumetric efficiency value η from the charge flow estimation strategy of FIG. 2. The output of block 208 is provided to a first input of a MAX block 210 having a second input receiving a constant K2 from block 212. The maximum value of K2 and the output of block 208 is provided to a fourth function block 214 producing a delay value D according to the equation:

$$D = (VFRAC * K)/(\eta * ES) \qquad (8),$$

where,

VFRAC is a scaling value,

K is a conversion constant (e.g., 120 rev*sec/cycle*min),

η is the volumetric efficiency of the intake manifold 14, and

ES is the engine speed (RPM).

The output D of function block 214 is provided to a first input of a delay block 216 having a second input receiving the residual oxygen fraction value RO2F from block 196, and providing a delayed output to an input of a filter block 218. The filter block 218 is preferably a first-order filter having a filter constant FC provided by block 218, although the present invention contemplates using other known filtering techniques for filter 218. In any case, the output of filter 218 (O2EGRF) represents the fraction of oxygen in the recirculated exhaust gas and is provided to a first input of a multiplication block 222 having a second input receiving the EGR mass value EGRM.

Delay block 216 is operable to delay the residual oxygen fraction value RO2F by an amount defined by the delay value D, wherein the delay is thus a function of engine speed ES and volumetric efficiency η. The delay provided by blocks 208–218 is intended to account for a transport lag between the EGR valve 38 and intake manifold 14, wherein the delay is based on the time necessary to move one displacement volume of fluid through the engine at a given volumetric efficiency. The scaling value VFRAC is operable to scale this delay time according to the displacement/EGR line volume ratio. The O2EGRF value thus incorporates a delay defined by the transport lag between the EGR valve 38 and the intake manifold 14.

The output of multiplication block 222 is provided to a first input of a summation block 224 having a second input receiving the output of a multiplication block 228. A first input of multiplication block 228 receives the residual mass value RM provided by block 152 of FIGS. 3 and 4, and a second input of block 228 receives a delayed residual oxygen fraction value (RO2F) from delay block 226. Delay block 226 is preferably operable to delay the residual oxygen fraction value RO2F and by one combustion cycle and provide this delayed RO2F value to block 228, wherein the output of block 228 is provided to the second input of summation block 224. The output of summation block 224 provides a value O2ME corresponding to the total mass of oxygen in the in-cylinder exhaust gas, and this value is provided to one input of summation block 230 having a second input receiving the O2MA value (mass of oxygen in the fresh air trapped in the engine cylinder. The output of block 230 defines the in-cylinder oxygen value O2IC produced by block 154.

The in-cylinder oxygen mass estimation strategy illustrated in FIG. 5 is, in accordance with the present invention, based on an estimation of the mass of oxygen in the trapped (in-cylinder) charge for the current combustion cycle plus the mass of oxygen in the trapped residual gases resulting from the previous combustion event. More specifically, the total mass of oxygen trapped in the cylinders of the engine for the current (kth) combustion cycle ($ICO2_K$) is estimated according to the equation:

$$ICO2_K = O2MA_K + O2ME_K \qquad (9),$$

where,

O2MA is the mass of oxygen in the fresh air portion of the charge trapped in the engine cylinders for the current (kth) combustion cycle, and O2ME is the mass of oxygen in the exhaust gas portion of the charge trapped in the engine cylinders for the current (kth) combustion cycle.

The first term, $O2MA_K$, is preferably computed as a standard fraction of oxygen in a dry air mass, wherein the dry air mass for equation (9) is computed as a difference between the values of the charge mass and the EGR mass trapped in the cylinders of the engine for the current (kth) combustion cycle. O2MA is thus preferably computed according to the equation:

$$O2MA_K = O2DA * (CM_K - EGRM_K) \qquad (10),$$

where,

O2DA is a conversion factor corresponding to a typical fraction of oxygen in dry air (e.g., 0.2319), $CM_K$ is the mass of charge trapped in the cylinders of the engine for the current (kth) combustion cycle, and $EGRM_K$ is the mass of recirculated exhaust gas trapped in the cylinders of the engine for the current (kth) combustion cycle.

It will be noted that equation (10) is the output of function block 188 of FIG. 5, and is identical to equation (6) above with the air mass value MA of equation (6) represented in terms of CM and EGRM.

The second term, $O2ME_K$, in equation (9) above is preferably estimated according to the equation:

$$O2ME_K = (RM_K * RO2F_K) + (EGRM_K * O2EGRF_{K-m}) \qquad (11),$$

where, $RM_K$ is the mass of residual gases from the previous combustion cycle now trapped in the cylinders of the engine for the current (kth) combustion cycle, $RO2F_K$ is the fraction of oxygen in the residual gases from the previous combustion cycle now trapped in the cylinders of the engine for the current (kth) combustion cycle, $EGRM_K$ is the mass of recirculated exhaust gas trapped in the cylinders of the engine for the current combustion cycle, and $O2EGRF_{K\_m}$ is the fraction of oxygen in the mass of recirculated exhaust gas, wherein $O2EGRF_{K\_m}$ is delayed by a time period of "m" engine cycles (m may be any positive integer) corresponding to the transport lag between the EGR valve 38 and intake manifold 14.

It will be noted that $O2ME_K$ is provided as the output of summation block 224 of FIG. 5, and that the outputs of blocks 224 and 188 are combined at block 230 to define the total in-cylinder oxygen mass value O2IC.

The $RO2F_K$ term of equation (11) is preferably estimated according to the equation:

$$RO2F_K=(O2MA_{K-1}-O2MB_{K-1}+O2ME_{K-1})/(C+FM_{K-1}) \quad (12)$$

where, $O2MA_{K-1}$ is the mass of oxygen in the fresh air portion of the charge trapped in the engine cylinders in the previous (k−1)th combustion cycle, $O2MB_{K-1}$ is the mass of oxygen required to burn the fuel trapped in the cylinders in the previous (k−1)th combustion cycle, $O2ME_{K-1}$ is the mass of oxygen in the exhaust gases trapped in the cylinders for the previous (k−1)th combustion cycle, and $C+FM_{K-1}$ is the sum of charge and fuel masses for the previous (k−1)th combustion cycle.

Substituting equation (11) into equation (12) yields the equation:

$$RO2F_K=(O2MA_{K-1}-O2MB_{K-1}+RM_{K-1}*RO2F_{K-1}+EGRM_{K-1}*O2EGRF_{K-m-1})/(C+FM_{K-1}) \quad (13)$$

It will be noted that $RO2F_K$ from equation (13) represents the output of the delay block 226 of FIG. 5.

Figure 6:
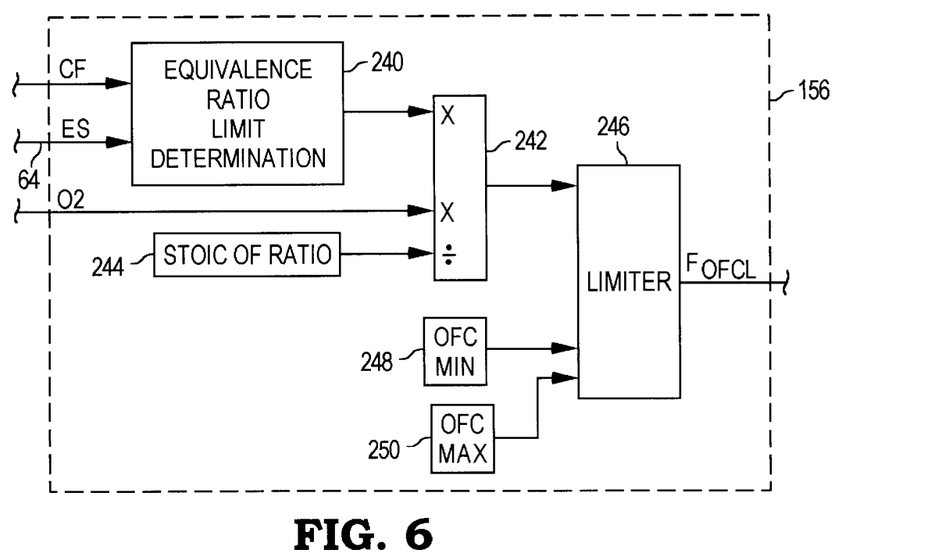
FIG. 6 is a diagrammatic illustration of one preferred embodiment of the OFC fuel limit estimator block of FIG. 3, in accordance with the present invention.
Figure 7:
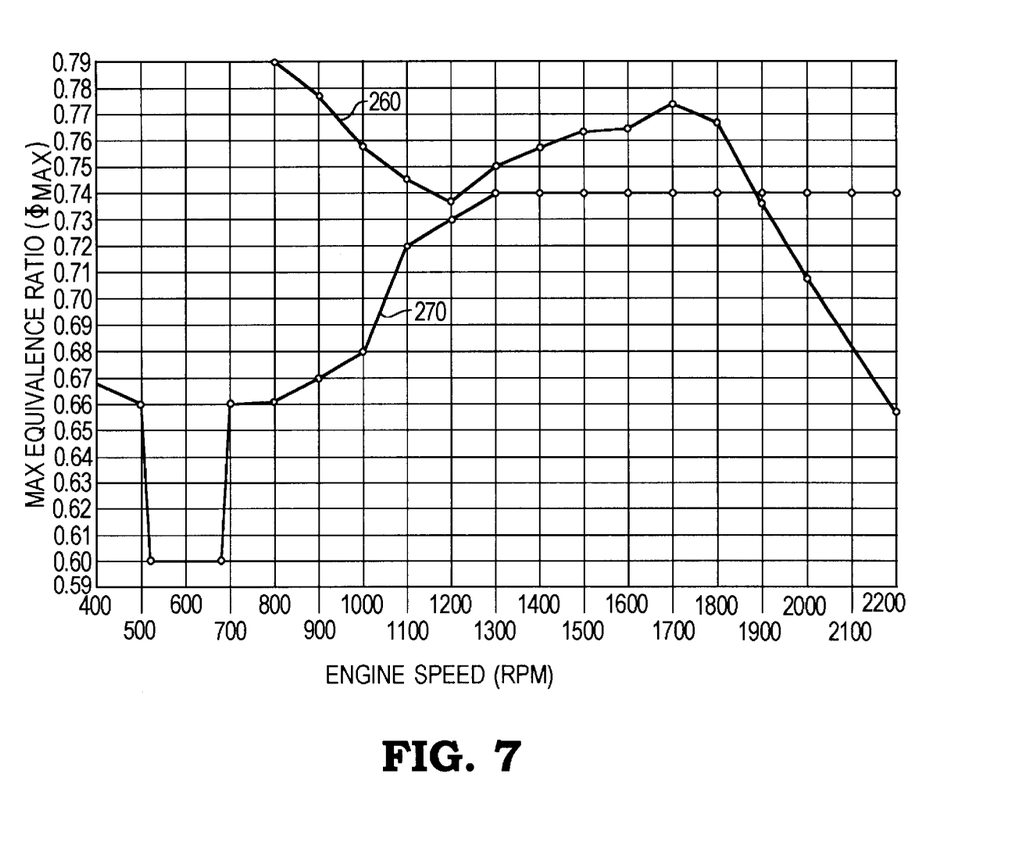
FIG. 7 is a plot illustrating a number of example relationships between maximum equivalence ration and engine speed, in accordance with the present invention.

Referring now to FIG. 6, one preferred embodiment of the OFC fuel limit estimator block 156 of FIG. 3, in accordance with the present invention, is shown. Block 156 includes an equivalence ratio limit determination block 240 having a first input receiving the default fueling value $F_{DEF}$ from the default fueling block 78 of FIG. 1, a second input receiving the engine speed signal (ES) from engine speed sensor 62 and an output producing a maximum equivalence ratio value ($\Phi_{MAX}$) as a function thereof. In one preferred embodiment, $\Phi_{MAX}$ values are predetermined as functions of engine speed (ES) and default fueling ($F_{DEF}$), and block 240 represents is a three-dimensional table or graph defining a number of $\Phi_{MAX}$ values stored therein as a function of ES and $F_{DEF}$ table or graph axes. An example two-dimensional slice of one such graph of $\Phi_{MAX}$ values is illustrated in FIG. 7 for two different engine types. For example, curve 260 represents a plot of $\Phi_{MAX}$ values vs. engine speed (RPM) and commanded fueling (not shown) for one engine type while curve 270 represents an $\Phi_{MAX}$ map for another engine type. It is to be understood that while the equivalence ratio limit determination block 240 of FIG. 6 has been described and represented in FIG. 7 as a table or graph, the present invention contemplates that block 240 may alternatively include one or more equations relating commanded fueling ($F_{DEF}$) and engine speed (ES) to a maximum equivalence ratio value $\Phi_{MAX}$.

In any case, the $\Phi_{MAX}$ output of block 240 is provided to a multiplication input of an arithmetic block 242 having a second multiplication input receiving the in-cylinder oxygen mass value from the in-cylinder oxygen estimator block 154. A division input of block 242 receives a stoichiometric oxygen/fuel ratio constant STOIC OF RATIO from block 244, wherein STOIC OF RATIO is a calibratable constant defined by fuel type. The resulting OFC fueling command produced by arithmetic block 242 is provided as an input to a known limiter block 246 receiving a minimum OFC fueling value OFC MIN from block 248 and a maximum OFC fueling value OFC MAX from block 250. Limiter block 246 is operable to produce the OFC limit fueling command $F_{OFCL}$ as the OFC fueling command produced by block 242 having a maximum value of OFC MAX and a minimum value of OFC MIN. The OFC fuel limit estimator is thus operable to use the in-cylinder oxygen mass value produced by the in-cylinder oxygen estimator block 154, along with a maximum equivalence ratio value $\Phi_{MAX}$ computed as a function of current engine speed and fueling command values, to compute a fuel limit value $F_{OFCL}$ that limits the equivalence ratio (ratio of fuel-to-oxygen) to $\Phi_{MAX}$ and accordingly constrains particulate emissions below a desired emissions level.

Figure 8:
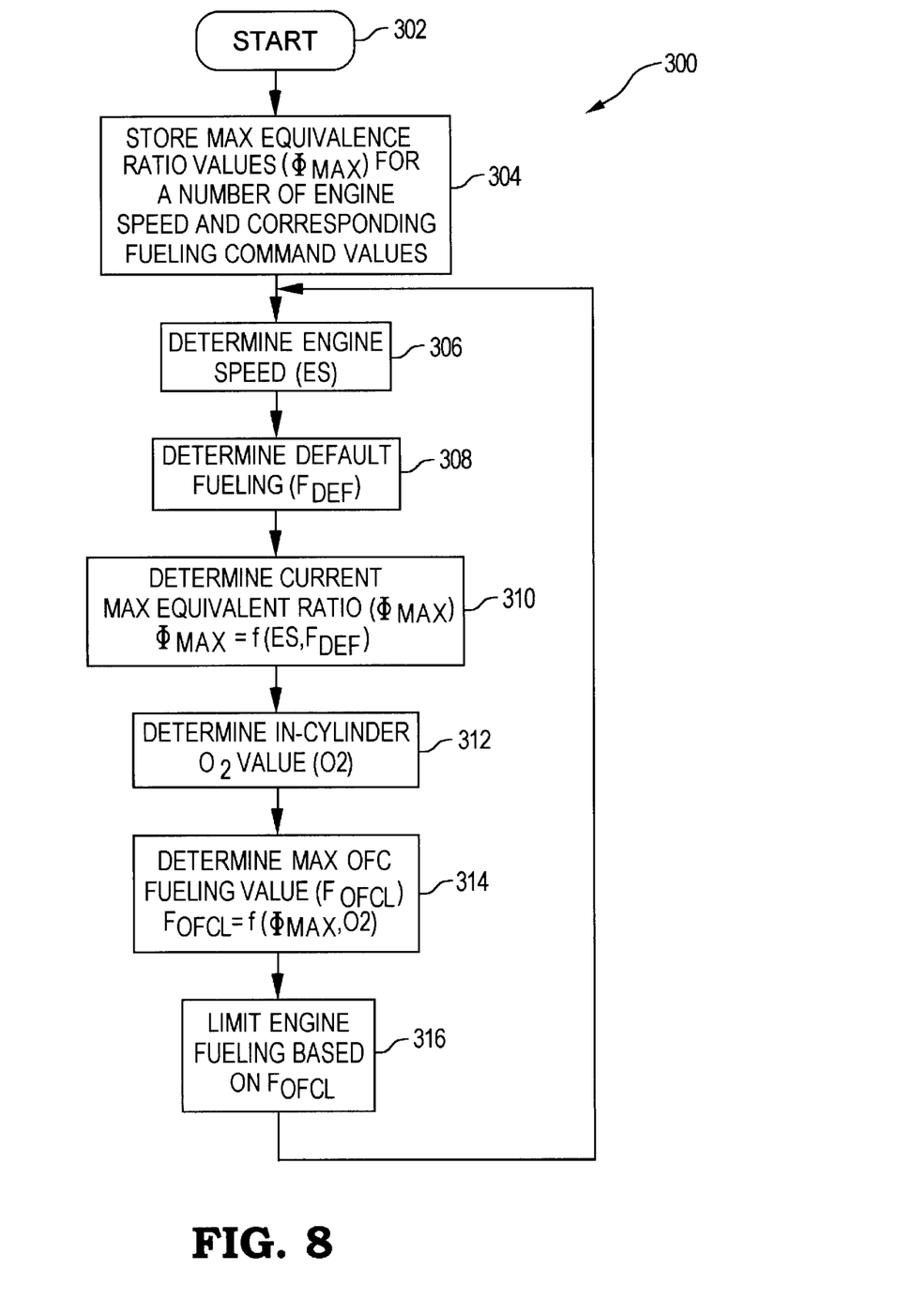
FIG. 8 is a flowchart illustrating one preferred embodiment of an algorithm for carrying out some of the concepts of the present invention.

Referring now to FIG. 8, a flowchart is shown illustrating a process 300 for carrying out the OFC fuel limiting function just described with respect to FIGS. 1–7. The process begins at step 302 and at step 304, a number of maximum equivalence ratio values $\Phi_{MAX}$ are stored in block 240 as functions of engine speed (ES) and fueling command values ($F_{DEF}$). Step 304 thus corresponds to providing for a graph, table or one or more equations relating $\Phi_{MAX}$ to engine speed and commanded fueling as described with respect to FIG. 6. Thereafter at step 306, the engine controller 42 is operable to determine a current value of engine speed (ES) preferably by monitoring the output of the engine speed sensor 62. Thereafter at step 308, the engine controller 42 is operable to determine a current default fueling value ($F_{DEF}$) preferably from the default fueling block 78 of FIG. 1.

From step 308, process 300 advances to step 310 where the engine controller 42 is operable to map the values of engine speed (ES) and default fueling ($F_{DEF}$) determined at steps 306 and 308 respectively to a maximum equivalence ratio $\Phi_{MAX}$ preferably using block 240 of FIG. 6. Thereafter at step 312, the engine controller 42 is operable to determine the in-cylinder oxygen mass (O2) preferably as described with respect to FIGS. 4 and 5, and at step 314 the engine controller 42 is operable to determine a maximum OFC fueling value ($F_{OFCL}$) as a function of the $\Phi_{MAX}$ and O2 values determined at steps 310 and 312 respectively, and preferably as described with respect to FIG. 6. Thereafter at step 316, the engine controller 42 is operable to limit engine fueling based on the maximum OFC fueling value $F_{OFCL}$. In one preferred embodiment of step 316, the engine controller 42 is operable to compare the OFC fueling value $F_{OFCL}$ with the default fueling value $F_{DEF}$ and fuel the engine 12 based on a minimum of the two fueling values. Those skilled in the art will recognize other known fuel limiting techniques for limiting engine fueling based on the OFC fueling value $F_{OFCL}$, and any such techniques are intended to fall within the scope of the present invention. In any case, process 300 preferably loops back to step 306 following execution of step 316.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. An equivalence ratio-based system for controlling transient fueling in an internal combustion engine comprising:

an engine speed sensor producing an engine speed signal indicative of rotational speed of said engine;

means for determining a quantity of oxygen trapped within a number of cylinders of said engine and producing an oxygen estimate corresponding thereto; and a control circuit producing a fueling command for fueling said engine and determining a maximum equivalence ratio value based on said fueling command and said engine speed signal, said control circuit limiting said fueling command based on said maximum equivalence ratio and said oxygen estimate.

2. The system of claim 1 further including a fueling system responsive to a final fueling command to supply fuel to said engine;

wherein said control circuit is operable to determine a limited fueling signal as a function of said maximum equivalence ratio and said oxygen estimate, and to produce said final fueling command as a minimum of said fueling command and said limited fueling command.

3. The system of claim 2 wherein said control circuit includes a number of maximum equivalence ratio values stored therein as functions of different values of said fueling command and of different values of said engine speed signal;

and wherein said control circuit is operable to determine said maximum equivalence ratio value by mapping current values of said fueling command and said engine speed signal to a stored one of said maximum equivalence ratio values.

4. The system of claim 2 wherein said control circuit includes a predefined stoichiometric oxygen-fuel ratio value stored therein;

and wherein said control circuit is operable to determine said limited fueling command as a product of said maximum equivalence ratio and said oxygen value divided by said predefined stoichiometric oxygen-fuel ratio value.

5. An equivalence ratio-based system for controlling transient fueling in an internal combustion engine, comprising:

an engine speed sensor producing an engine speed signal indicative of rotational speed of said engine;

means for determining a residual mass value corresponding to a mass of residual gases trapped within a number of cylinders of said engine;

means for producing a fueling command for fueling said engine;

means responsive to said residual mass value, said engine speed signal and said fueling command for determining a quantity of oxygen trapped within said number of cylinders of said engine and producing an oxygen value corresponding thereto; and a control circuit limiting said fueling command based on said engine speed signal, said fueling command and said oxygen value.

6. The system of claim 5 further including means for determining a mass flow of charge entering an intake manifold of said engine and producing a charge flow value corresponding thereto;

and wherein said means for determining said quantity of oxygen is further responsive to said charge flow value for determining said quantity of oxygen trapped within said number of cylinders of said engine and producing said oxygen value corresponding thereto.

7. The system of claim 5 further including means for determining a volumetric efficiency of an intake manifold of said engine and producing a volumetric efficiency value corresponding thereto;

and wherein said means for determining said quantity of oxygen is further responsive to said volumetric efficiency value for determining said quantity of oxygen trapped within said number of cylinders of said engine and producing said oxygen value corresponding thereto.

8. The system of claim 5 further including means for determining a mass flow of exhaust gas recirculated from an exhaust manifold to an intake manifold of said engine and producing an EGR flow value corresponding thereto;

and wherein said means for determining said quantity of oxygen is further responsive to said EGR flow value for determining said quantity of oxygen trapped within said number of cylinders of said engine and producing said oxygen value corresponding thereto.

9. The system of claim 5 further including:

means for determining a mass flow of charge entering an intake manifold of said engine and producing a charge flow value corresponding thereto;

means for determining a volumetric efficiency of said intake manifold and producing a volumetric efficiency value corresponding thereto; and means for determining a mass flow of exhaust gas recirculated from an exhaust manifold of said engine to said intake manifold and producing an EGR flow value corresponding thereto;

and wherein said means for determining said quantity of oxygen includes means for estimating said quantity of oxygen based on said engine speed signal, said fueling command, said charge flow value, said volumetric efficiency value and said EGR flow value, and producing said oxygen value corresponding thereto.

10. The system of claim 5 further including means for determining an exhaust pressure value corresponding to a pressure of exhaust gases produced by said engine;

wherein said means for determining said residual mass value includes means responsive to said exhaust pressure value for determining said residual mass value.

11. The system of claim 10 further including means for determining an exhaust temperature value corresponding to a temperature of exhaust gases produced by said engine;

wherein said means for determining said residual mass value further includes means responsive to said exhaust temperature value for determining said residual mass value.

12. The system of claim 11 wherein said means for determining said residual mass value includes means for estimating said residual mass value as a product of said exhaust pressure value and a predefined mass density constant divided by said exhaust temperature value.

13. An equivalence ratio-based method for controlling transient fueling in an internal combustion engine, the method comprising the steps of:

sensing rotational speed of said engine and producing an engine speed signal corresponding thereto;

determining a maximum equivalence ratio value based on an engine fueling command and said engine speed signal;

determining a quantity of oxygen trapped within a number of cylinders of said engine and producing an oxygen value corresponding thereto; and limiting fuel supplied to said engine based on said maximum equivalence ratio and said oxygen value.

14. The method of claim 13 wherein the step of limiting fuel supplied to said engine further includes:

determining a limited fueling signal as a function of said maximum equivalence ratio and said oxygen value;

producing a final fueling command as a minimum of said engine fueling command and said limited fueling command; and fueling said engine according to said final fueling command.

15. The method of claim 13 further including the step of storing a number of maximum equivalence ratio values as functions of different values of said engine fueling command and of different values of said engine speed signal;

and wherein the step of determining said maximum equivalence ratio value includes determining said maximum equivalence ratio value by mapping current values of said engine fueling command and said engine speed signal to a stored one of said maximum equivalence ratio values.

16. The method of claim 14 further including the step of storing a predefined stoichiometric oxygen-fuel ratio value;

and wherein the step of limiting fuel supplied to said engine includes limiting fuel supplied to said engine based on a product of said maximum equivalence ratio and said oxygen value divided by said predefined stoichiometric oxygen-fuel ratio value.

17. An equivalence ratio-based method for controlling transient fueling in an internal combustion engine, comprising the steps of:

sensing rotational speed of said engine and producing an engine speed signal corresponding thereto;

determining a residual mass value corresponding to a mass of residual gases trapped within a number of cylinders of said engine;

producing a fueling command for fueling said engine;

determining a quantity of oxygen trapped within said number of cylinders of said engine based on said engine speed, said residual mass value and said fueling command and producing an oxygen value corresponding thereto; and limiting said fueling command based on said engine speed signal, said fueling command and said oxygen value.

18. The method of claim 17 further including the step of determining a mass flow of charge entering an intake manifold of said engine and producing a charge flow value corresponding thereto;

and wherein the step of determining said quantity of oxygen includes determining said quantity of oxygen based further on said charge flow value.

19. The method of claim 17 further including the step of determining a volumetric efficiency of an intake manifold of said engine and producing a volumetric efficiency value corresponding thereto;

and wherein the step of determining said quantity of oxygen includes determining said quantity of oxygen based further on said volumetric efficiency value.

20. The method of claim 17 further including the step of determining a mass flow of exhaust gas recirculated from an exhaust manifold to an intake manifold of said engine and producing an EGR flow value corresponding thereto;

and wherein the step of determining said quantity of oxygen includes determining said quantity of oxygen based further on said EGR flow value.

21. The method of claim 17 further including the steps of:

determining a mass flow of charge entering an intake manifold of said engine and producing a charge flow value corresponding thereto;

determining a volumetric efficiency of said intake manifold and producing a volumetric efficiency value corresponding thereto; and determining a mass flow of exhaust gas recirculated from an exhaust manifold of said engine to said intake manifold and producing an EGR flow value corresponding thereto;

and wherein the step of determining said quantity of oxygen includes estimating said quantity of oxygen based on said engine speed signal, said fueling command, said charge flow value, said volumetric efficiency value and said EGR flow value, and producing said oxygen value corresponding thereto.

22. The method of claim 17 further including the step of determining an exhaust pressure value corresponding to a pressure of exhaust gas produced by said engine;

and wherein the step of determining said residual mass value includes determining said residual mass value based on said exhaust pressure value.

23. The method of claim 22 further including the step of determining an exhaust temperature value corresponding to a temperature of said exhaust gas;

and wherein the step of determining said residual mass value includes determining said residual mass value based further on said exhaust temperature value.

24. The system of claim 23 wherein the step of determining said residual mass value includes estimating said residual mass value as a product of said exhaust pressure value and a predefined mass density constant divided by said exhaust temperature value.

* * * * *